Patented Mar. 20, 1951

2,545,764

UNITED STATES PATENT OFFICE 2,545,764

PREPARATION OF SULFANILYLTHIOUREA

Paul Charpentier, Choisy-le-Roi, France, assignor to Societe des Usines Chimiques Rhone Poulenc, Paris, France, a French company No Drawing. Application June 26, 1946, Serial No. 679,581. In France October 19, 1943

Section 1, Public Law 690, August 8, 1946
Patent expires October 19, 1963

1 Claim. (Cl. 260—397.7)

This invention is for improvements in or relating to the preparation of arylsulphonylthioureas.

The present applicant has conducted a comprehensive investigation of a process of preparing N-arylsulphonylthioureas which comprises bringing about the addition of hydrogen sulphide to the triple bond of arylsulphoncyanamides in accordance with the following scheme:

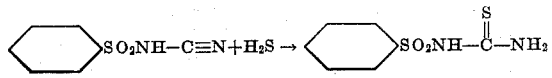

In these compounds the benzene ring can be substituted by one or more substituents such as alkyl, aralkyl, aryl, amino, acylamino, hydroxyl and alkoxyl. This process is especially useful for the preparation of N(p-aminobenzenesulphonyl)-thiourea which exerts remarkable antibacterial and antimycosic properties.

The addition reaction according to the above equation has heretofore been effected either in presence of anhydrous pyridine or in presence of ammonia or in alcoholic solutions containing varying amounts of an aqueous alkali hydroxide.

According to the present invention, it has now been discovered that this addition reaction can be effected with increased yield if effected in an anhydrous medium and in the presence of a member of the class consisting of anhydrous ammonia and of anhydrous organic bases and of a catalyst consisting of sulphur. The catalyst may be added as such to the reaction mixture or may be generated in situ by the use of a substance capable of generating nascent sulphur under the conditions of the reaction.

According to a preferred embodiment of the present invention, an anhydrous alcoholic solution of the N-arylsulphonylcyanamide containing a member of the class consisting of anhydrous ammonia and anhydrous organic bases such as diethylamine, and a substance capable of generating nascent sulphur is saturated with hydrogen sulphide and the reaction mixture is heated to a temperature of 50–100° C., preferably around 70° C., in a sealed vessel until the reaction is completed.

Specific examples of catalysts for use in the process of the present invention are flowers of sulphur, sodium polysulphide, sodium thioantimonate, the disulphide of tetramethylthiouram, sulphurous chloride and peroxides (of hydrogen, sodium or benzoyl).

The process of the present invention is illustrated by the following non-limitative examples:

Example I 5 g. of p-aminobenzenesulphonylcyanamide are dissolved in 50 cc. of absolute ethyl alcohol containing 2 g. of diethylamine and 0.2 g. of the disulphide of tetramethylthiouram are added thereto. The mixture is saturated with hydrogen sulphide at about 0° C., whereupon the whole is heated to 70° C., in a sealed tube for 18 hours. The alcohol is then distilled off under vacuum and the residue taken up in 50 cc. of water and acidified with acetic acid. The precipitate formed is filtered off, washed with water and dried. N(p-aminobenzene-sulphonyl)-thiourea is thereby obtained in very good yield. It melts at about 200° C. with decomposition (Maquenne block).

Example II

To a solution of 5 g. of p-aminobenzenesulphonylcyanamide in 50 cc. of absolute ethyl alcohol containing 0.6 g. of ammonia in solution, 0.2 g. of sulphurous chloride is added and the whole is saturated at 0° C. with hydrogen sulphide. It is then heated in a sealed tube for 24 hours at 70° C. After cooling, the precipitate is centrifuged, collected, washed with alcohol and then dissolved in warm water made slightly alkaline with ammonia. The solution is acidified with acetic acid and the precipitate worked up as in Example I.

I claim:

A process for the production of p-amino benzene sulphonyl thiourea by the addition of hydrogen sulphide to the corresponding p-amino benzene sulphonyl cyanamide characterized in that the reaction is effected at 50 to 100° C. in a sealed vessel in an anhydrous medium and in the presence of ammonia and of a catalyst consisting of nascent sulphur.

PAUL CHARPENTIER.

REFERENCES CITED

The following references are of record in the file of this patent:

UNITED STATES PATENTS

| Number | Name | Date |
|---|---|---|
| 2,254,136 | Buck et al. | Aug. 26, 1941 |
| 2,336,907 | Winnek | Dec. 14, 1943 |
| 2,380,006 | Winnek et al. | July 10, 1945 |
| 2,498,782 | Arquet et al. | Feb. 28, 1950 |

FOREIGN PATENTS

| Number | Country | Date |
|---|---|---|
| 260,061 | Germany | May 13, 1913 |
| 297,999 | Great Britain | Oct. 4, 1928 |
| 336,111 | Great Britain | Oct. 7, 1930 |

OTHER REFERENCES

Winnek et al.: Jour. Am. Chem. Soc., vol. 64 (1942), p. 1682.